United States Patent
Kramer

(10) Patent No.: US 7,091,953 B1
(45) Date of Patent: Aug. 15, 2006

(54) MULTI-PURPOSE KEYBOARD

(75) Inventor: Oren Kramer, Tel Aviv (IL)

(73) Assignee: Ideazon, Inc., Vaughn (CA)

( * ) Notice: Subject to any disclaimer, the term of this patent is extended or adjusted under 35 U.S.C. 154(b) by 5 days.

(21) Appl. No.: 10/049,760

(22) PCT Filed: Aug. 3, 2000

(86) PCT No.: PCT/IL00/00465

§ 371 (c)(1),
(2), (4) Date: May 1, 2002

(87) PCT Pub. No.: WO01/11788

PCT Pub. Date: Feb. 15, 2001

(51) Int. Cl.
*G09G 5/00* (2006.01)
*H03K 17/94* (2006.01)
*G06F 1/16* (2006.01)

(52) U.S. Cl. ........................ 345/168; 341/20; 341/22; 341/24; 463/37; 235/145 R; 361/680

(58) Field of Classification Search ........ 345/168–172; 400/489; 341/22, 20, 24; 463/37; 200/5 R, 200/520, 5 B, 5 C, 5 ER, 344; 361/680; 275/145 R, 146, 145 A
See application file for complete search history.

(56) References Cited

U.S. PATENT DOCUMENTS

| 4,092,527 | A | | 5/1978 | Luecke |
| 4,456,972 | A | * | 6/1984 | Lee et al. ................... 345/169 |
| 4,459,581 | A | * | 7/1984 | Wilson et al. ................ 341/23 |
| 4,527,250 | A | * | 7/1985 | Galdun et al. .............. 345/700 |
| 4,906,117 | A | * | 3/1990 | Birdwell ...................... 400/490 |
| 5,144,302 | A | | 9/1992 | Carter et al. |
| 5,146,615 | A | * | 9/1992 | Hodsdon et al. ........... 455/90.3 |
| 5,150,118 | A | * | 9/1992 | Finkle et al. ................. 341/23 |
| 5,387,042 | A | * | 2/1995 | Brown ........................ 400/477 |
| 5,450,078 | A | * | 9/1995 | Silva et al. ................... 341/23 |
| 5,457,453 | A | * | 10/1995 | Chiu et al. .................... 341/22 |
| 5,514,855 | A | | 5/1996 | Sullivan .................. 235/145 R |
| 5,576,981 | A | * | 11/1996 | Parker et al. ............... 708/140 |
| 5,601,489 | A | | 2/1997 | Komaki |
| 5,667,319 | A | | 9/1997 | Satloff ........................ 400/472 |
| 5,865,546 | A | | 2/1999 | Ganthier et al. ............ 400/489 |
| 6,018,334 | A | * | 1/2000 | Eckerberg et al. .......... 345/163 |
| 6,081,207 | A | * | 6/2000 | Batio ........................... 341/20 |
| 6,104,604 | A | | 8/2000 | Anderson et al. ........... 361/680 |
| 6,263,392 | B1 | * | 7/2001 | McCauley ................... 710/305 |
| 6,317,061 | B1 | * | 11/2001 | Batra et al. ................... 341/22 |
| 6,587,094 | B1 | * | 7/2003 | Anderson ................... 345/168 |
| 6,606,669 | B1 | * | 8/2003 | Nakagiri ..................... 719/327 |
| 6,727,890 | B1 | | 4/2004 | Andres et al. |
| 2003/0132916 | A1 | | 7/2003 | Kramer |

FOREIGN PATENT DOCUMENTS

WO    WO 01/011788    2/2001

* cited by examiner

*Primary Examiner*—Henry N. Tran
(74) *Attorney, Agent, or Firm*—Bereskin & Parr

(57) ABSTRACT

A keyboard for use as an input device for a host computer comprising a removable part that comprises a set of specific of keys each of which having a contact and held by a foundation. The removable part is associated with a specific software application to be executed on the host computer using the set, and comprises a device for data-connection and a data storage device containing an Identification Data (ID) associated with the specific application. The keyboard also comprises a fixed part, into which the removable part is installed.

7 Claims, 7 Drawing Sheets

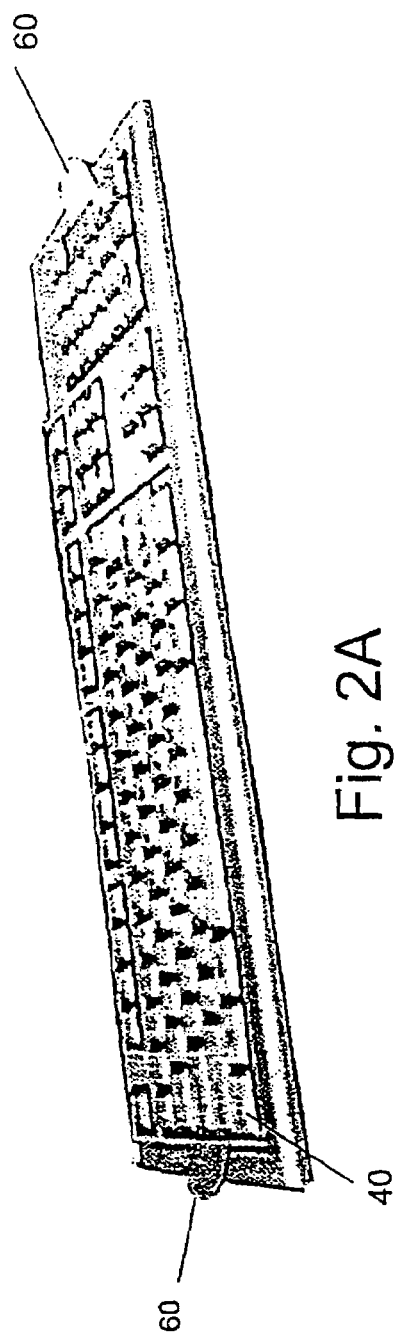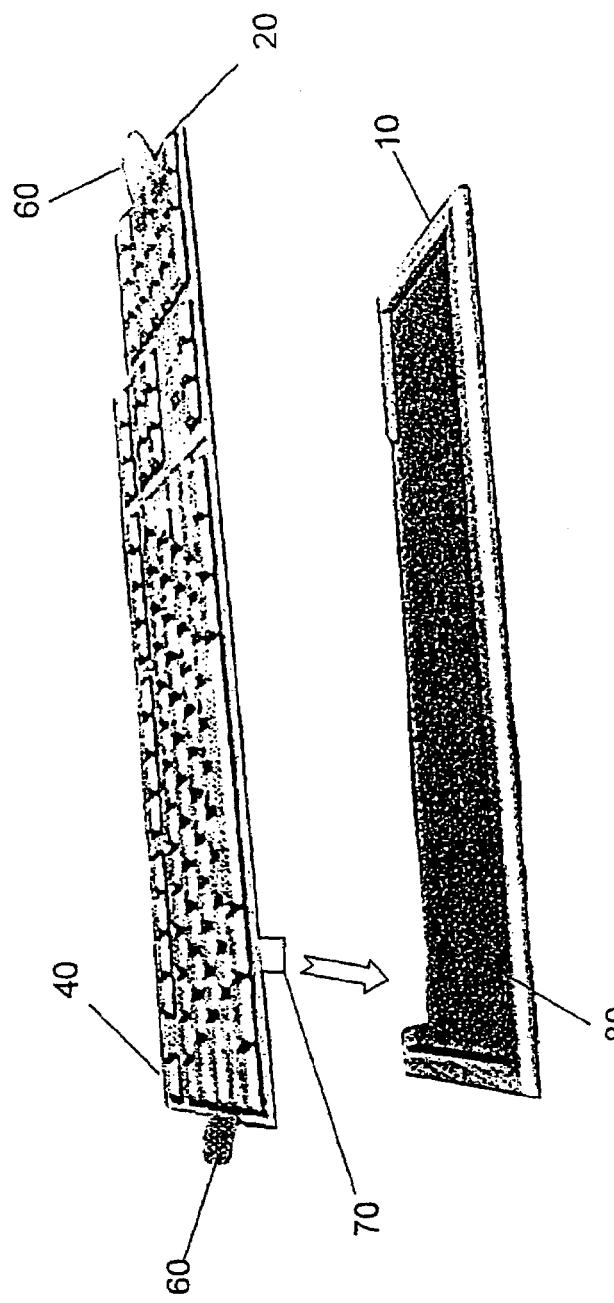
Fig. 2A
Fig. 2B

MULTI-PURPOSE KEYBOARD

FIELD OF THE INVENTION

The present invention relates to the field of input devices. More particularly, the invention relates to a method and apparatus for providing functional input for computerized systems.

BACKGROUND OF THE INVENTION

In most computers, a keyboard is the primary main input and control device typically used to input text. The keyboard also contains specific standard function keys, such as the Escape key, the Tab and cursor movement keys, the Shift and Control keys, and sometimes other manufacturer-customized keys.

The computer keyboard uses the same basic arrangement as the mechanical and electronic typewriter keyboards that preceded the computer. The standard arrangement of alphabet keys is known as the Qwerty keyboard, its name deriving from the arrangement of the five keys at the upper left of the three rows of alphabet keys. This arrangement, invented for one of the earliest mechanical typewriters, dates back to the 1870s.

Because many keyboard users develop a cumulative trauma disorder, such as carpal tunnel syndrome, a number of ergonomic keyboards have been developed. Current techniques include keyboards contoured to alleviate stress and foot-driven pedals for certain keys or keyboard functions.

Nowadays, the personal computer has a wide variety of applications and games. Personal computers are operated by users of all ages with diverse needs and languages. Even so, the number of keyboard types used is relatively small in comparison to the number of implementations utilized. The main factors governing this phenomenon are financial and pragmatic considerations.

The manufacturing process of keyboards is a relatively expensive process. Therefore, keyboards are fabricated in mass-produced series, in order to make them affordable to the common PC user. However, sometimes computer games are not mass-produced, and their manufacturers cannot attach a dedicated keyboard to each game or application sold. In any event, if one looks at this issue from the user's point of view, it is not convenient to switch to a different keyboard for each game or application, especially when the plug resides in the rear side of the computer. Furthermore, when using several keyboards, the problem of storing these keyboards arises.

Due to different key layouts in different countries, it is necessary to implement a look-up table technique in order to use the same basic keyboard for a plurality of countries. Moreover, some computer programs allow the performance of specific operations by using a predefined sequence of keys, especially when the number of operations is greater than the number of keys, such as, "Ctrl-D, Alt-A, Ctrl-Shift-F". Other computer programs use a sequence of keystrokes, usually called a "macro", as input. Macros can be stored on the computer's memory, or embedded in the keyboard hardware (usually memory means), which gives the keyboard the status of "smart-keyboard".

Due to recent developments of a combination between TV and the Internet, a new type of keyboard design is flourishing nowadays. However, browsing the Internet with a regular TV remote control system is very difficult, due to the fact that the number of keys in TV remote control systems is insufficient compared to those required while browsing the Internet. For browsing the Internet, the keyboard must comprise the literal keys, especially when composing e-mail.

U.S. Pat. No. 5,514,855 deals with the above-mentioned issues. A molded rigid panel, which is provided with a plurality of over-sized keys, "diminishes" the number of keys. It is useful for computer games and applications directed to very young children.

U.S. Pat. No. 5,667,319 deals with a non-conventional keyboard, actually a simplified keyboard for use by a child. Typically, the simplified keyboard of this patent has keys which are optimized in design, number and placement for use by young children, but which electrically interfaces the computer in a manner similar to standard keyboards for manual entry of symbolic data for use by the computer software.

All the methods described above have not yet provided satisfactory solutions to the problem of using a keyboard designed for a special application at a low cost. Moreover, all the methods described above have not yet provided satisfactory solutions to the problem of associating a keyboard with a computer program for executing an application that requires a special keyboard.

It is an object of the present invention to provide a dedicated keyboard apparatus whose manufacturing cost will be lower than that known in the prior art.

It is another object of the invention to provide a method and apparatus for replacing a keyboard on a host machine, which is simpler than those of the prior art.

It is a further object of the invention to provide a method and apparatus which associates between a keyboard and a computer's application, for executing and simplifying that application.

It is a further object of the invention to provide a method and apparatus which associates between a keyboard and a computer's setup, for setting up the computer.

Other objects and advantages of the invention will become apparent as the description proceeds.

SUMMARY OF THE INVENTION

In one aspect, the present invention is directed to a keyboard for use as an input device for a host computer, the computer being able to execute one or more software applications, comprising:

a removable part comprising a set of specific of keys each of which having a contact and held by a foundation, the removable part being associated with a specific software application to be executed on the host computer using the set, the removable part comprising a device for data-connection and a data storage device containing an Identification Data (ID) associated with the specific application;

a fixed part, into which the removable part is installed, the fixed comprising:

I) a set of contacts, each of which corresponding to zero or more contacts of the removable part, for receiving input data;

II) a reader device for reading the ID from the data storage device;

III) a first data-connection means from the reader to the data connection device; and IV) a second data connection means to the host computer, for transferring the ID from the reader, and data input from the set, to the host computer, so as to allow the host computer to execute the specific software application upon placing the removable part into the fixed part.

Optionally, the reader, the first data connection means and the storage device are replaced by a mechanical member extending out of the removable part, for applying a mechanical force on a predetermined contact in the fixed part whenever the removable part is placed into the fixed part, the mechanical force causing ID data related to a specific set to be transmitted to the host computer via the second data connection means, after a predetermined period has been lapsed.

Optionally, the removable part is a single rigid unit or a plurality of rigid units that can be folded.

Optionally, the ID is embedded into the identification mechanism by electronic means and/or by electro-optic means and/or by electromechanical means and/or magnetic means.

Optionally, the keys layout is compatible with a standard 101-keys keyboard.

In another aspect, the invention is directed to a system for use as an input mechanism for a host computer, comprising:

A keyboard for use as an input device for a host computer, the computer being able to execute one or more software applications, comprising:
  a removable part comprising a set of specific of keys each of which having a contact and held by a foundation, the removable part being associated with a specific software application to be executed on the host computer using the set, the removable part comprising a device for data-connection and a data storage device containing an Identification Data (ID) associated with the specific application;
  a fixed part, into which the removable part is installed, the fixed comprising:
    I) a set of contacts, each of which corresponding to zero or more contacts of the removable part, for receiving input data;
    II) a reader device for reading the ID from the data storage device;
    III) a first data-connection means from the reader to the data connection device; and
    IV) a second data connection means to the host computer, for transferring the ID from the reader, and data input from the set, to the host computer, so as to allow the host computer to execute the specific software application upon placing the removable part into the fixed part.
  a software component for reading the ID and executing one or more program(s) and/or one or more application(s) and/or one or more predefined operation(s), the software component residing on the host computer and executed by the host computer, the program(s), the application(s) and the operation(s) being associated with the ID.

Optionally, the predefined operations are directed to setup the host.

In another aspect, the invention is directed to a method for connecting a keyboard to a host computer, comprising:
  a) Providing a keyboard for use as an input device for a host computer, the computer being able to execute one or more software applications, comprising:
    a removable part comprising a set of specific of keys each of which having a contact and held by a foundation, the removable part being associated with a specific software application to be executed on the host computer using the set, the removable part comprising a device for data-connection and a data storage device containing an Identification Data (ID) associated with the specific application;
    a fixed part, into which the removable part is installed, the fixed comprising:
      I) a set of contacts, each of which corresponding to zero or more contacts of the removable part, for receiving input data;
      II) a reader device for reading the ID from the data storage device;
      III) a first data-connection means from the reader to the data connection device; and
      IV) a second data connection means to the host computer, for transferring the ID from the reader, and data input from the set, to the host computer, so as to allow the host computer to execute the specific software application upon placing the removable part into the fixed part.
  b) Providing a software component for reading the ID and executing one or more program(s) and/or one or more application(s) and/or one or more predefined operation(s), the software component residing on the host computer and executed by the host computer, the program(s), the application(s) and the operation(s) associated with the ID.
  c) Connecting between the removable part and the fixed part by contact upon placing the removable part on the fixed part;
  d) Reading the ID by the reader device;
  e) Conveying the ID from the keyboard to the host computer via the connection;
  f) Executing one or more program(s) and/or one or more application(s) and/or one or more predefined operation(s), the program(s), the application(s) and the operation(s) being associated with the ID.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 2 illustrates a keyboard, according to a preferred embodiment of the invention;

DETAILED DESCRIPTION OF PREFERRED EMBODIMENTS

Figure 1:
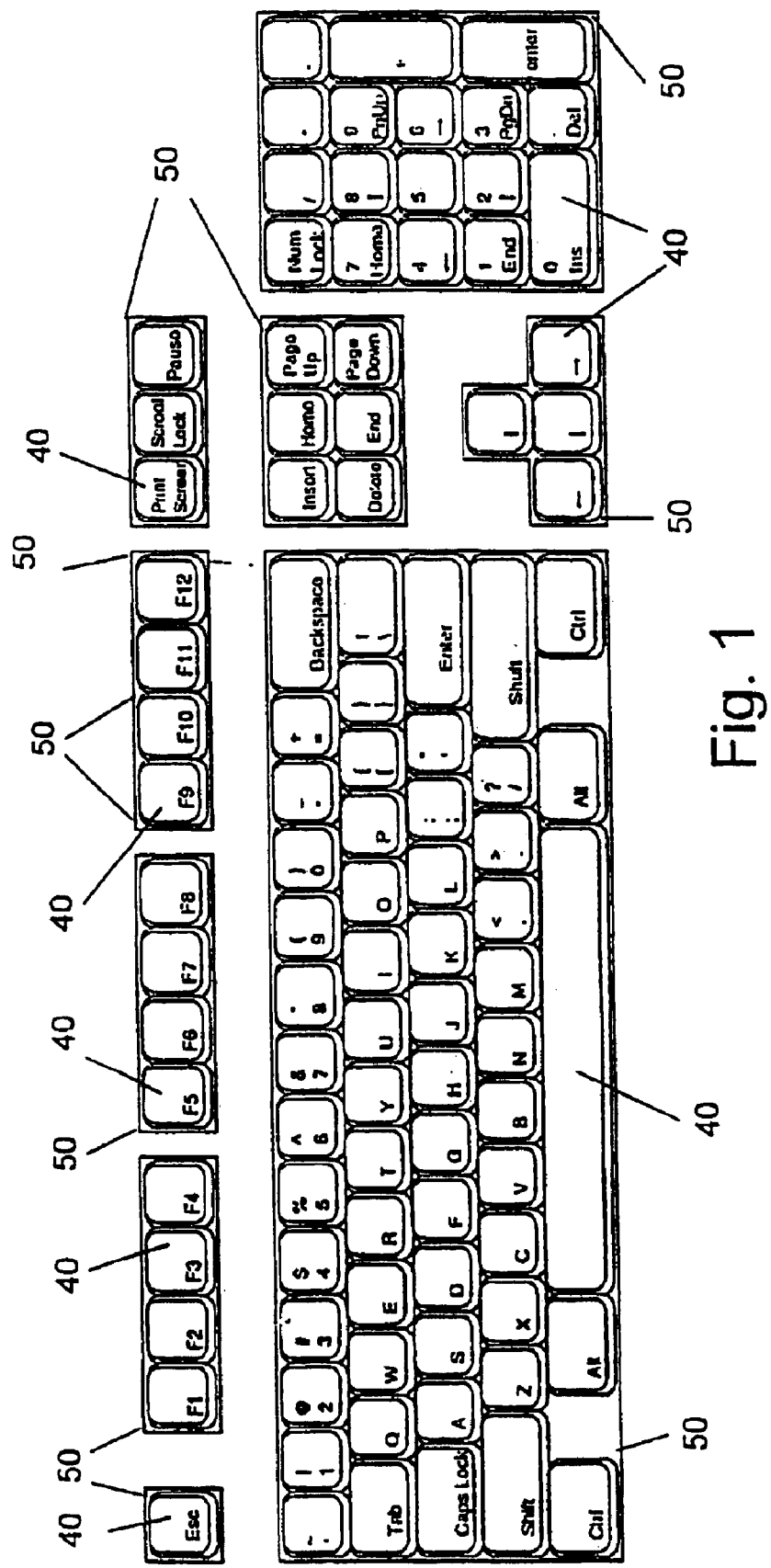
FIG. 1 illustrates a "101-keys" keyboard, according to the prior art.

FIG. 1 illustrates a "101 keys" keyboard, according to the prior art. Nowadays, the "101 keys" keyboard is the most commonly used keyboard. The keys 40 are installed in an immersed area 50. Such a keyboard is suitable for being use as an input device in text-related applications, such as word processors. However, when it comes to stick-games, this kind of keyboard is less efficient. Stick-games are better operated with a joystick, and the keyboard layout should be designed in such a way that the user will feel as if actually inside a cockpit. Moreover, the texture of the keys does not suit the purpose of the game at all.

In order to manufacture dedicated keyboards with fewer expenses, according to the disclosed invention, a keyboard may be separated into two parts:

One part comprises the elements of the keyboard, which are useful for a variety of keyboards type, hereinafter called "the replaceable part of the keyboard";

The other part comprises elements that are typical of a dedicated keyboard, hereinafter called "the fixed part of the keyboard".

By setting the replaceable part of the keyboard on the fixed part of the keyboard, clicking a key causes the same effect as in a keyboard known from the prior art.

As a result, the key contacts the electronic circuit. Due to this contact, a number that is associated with the key is submitted to the host computer.

According to the disclosed invention, the following benefits are achieved:

The keyboard may be designed according to its dedicated purpose, not merely applicable for a variety of purposes. This way the design fits its purpose in a better way than presently known in prior art.

Since for many implementations, the presence of all 101 keys (as in the most commonly used keyboard) is not required, the keyboard may be designed such a way that the keys are gathered in small region. This way the keyboard becomes compact, and hence such a keyboard may be sold with a computer game or application. Furthermore, when using the same size of keyboard with fewer keys, the keys may be bigger, and hence easy to operate.

Due to the fact that a dedicated keyboard is associated with a certain implementation(s), by detecting the type of the keyboard, the host computer may execute a program that is associated with the keyboard, or to allow the user to select one of the implementations associated with this keyboard. For example, a dedicated keyboard may be suitable for a variety of football games.

FIG. 2a and FIG. 2b illustrate a keyboard, according to a preferred embodiment of the invention. The keyboard is composed of two parts: The fixed part 10 and the replaceable part 20. FIG. 2a illustrates the combined keyboard, according to a preferred embodiment of the invention. FIG. 2b illustrates the separate parts of a keyboard, according to a preferred embodiment of the invention.

The base 10 of the keyboard is fixed, while the removable part 20 of the keyboard may be replaced by another replaceable element. The keys 40 are installed in the removable part 20 of the keyboard. According to a preferred embodiment of the invention, the handles 60 are attached to the removable part 20 of the keyboard. Hence, the removable part 20 may be removed by lifting the handles 60. Of course the removable part 20 may be removed in other ways also.

There are a variety of ways to fasten the removable part 20 of the keyboard to the fixed part 10 of the keyboard, such as a hooking mechanism, screwing mechanism, magnet mechanism, and sometimes even the weight of the removable part is adequate. There are also a variety of ways to establish contact between the removable and fixed parts of the keyboard. A combination of fastening mechanism and contact mechanism can also be used.

Figure 3:
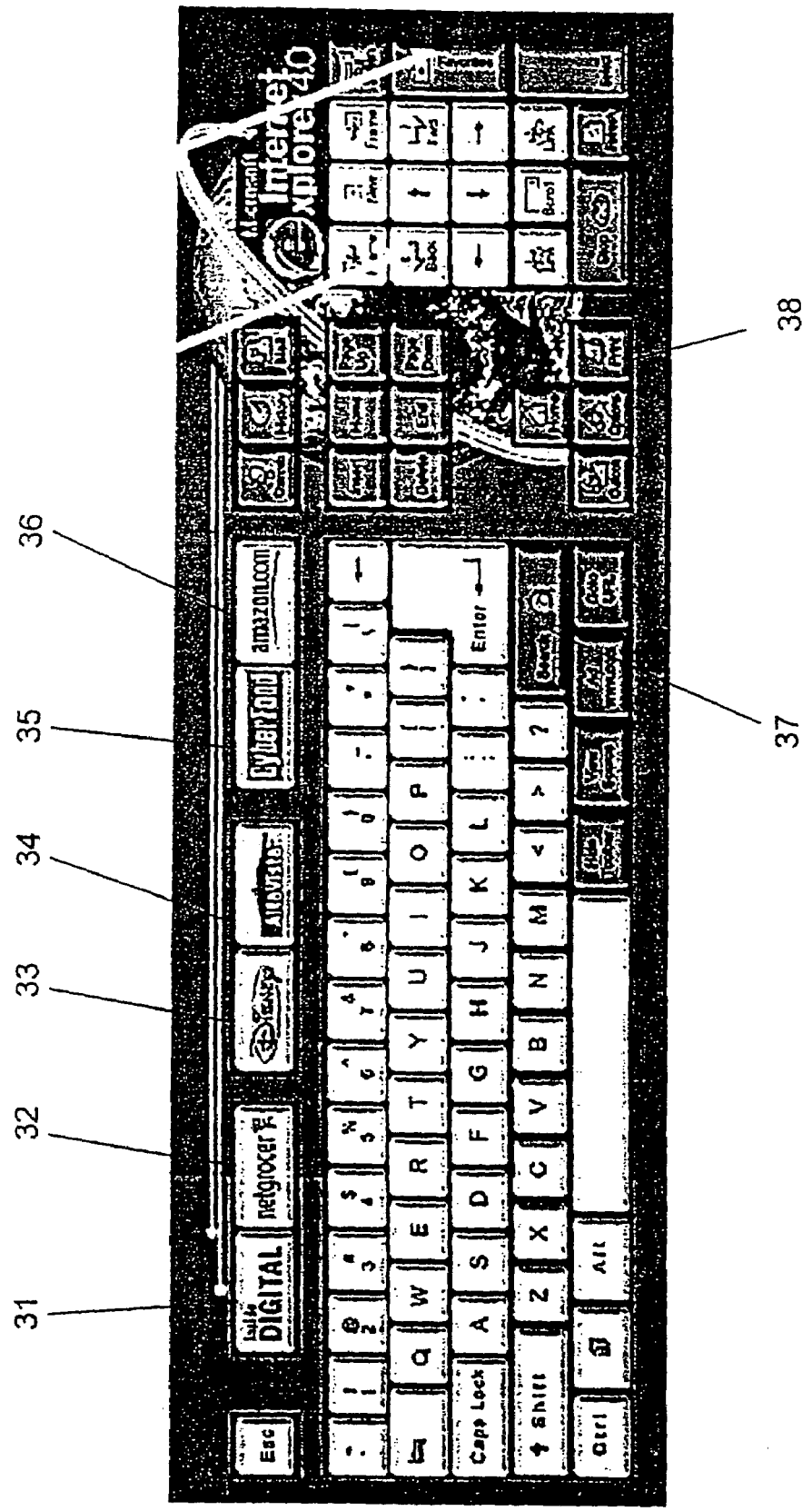
FIG. 3 illustrates a dedicated keyboard layout, according to a preferred embodiment of the invention.

FIG. 3 illustrates a dedicated keyboard layout, according to a preferred embodiment of the invention. The keyboard is dedicated to operations related to the Internet. By pressing keys 31 to 36, the browser will be directed to the appropriate Web site. By clicking key 37, the browser will be directed to a Web page that contains links to search engines, such as Yahoo, Infoseek, etc. By clicking key 38, the current page will be printed.

Although the keyboard in FIG. 3 is designed like the commonly used 101-keys keyboard, the size of key 31 is that of the keys F1 and F2 in FIG. 1 together. The same is true of keys 32 to 36.

Figure 4:
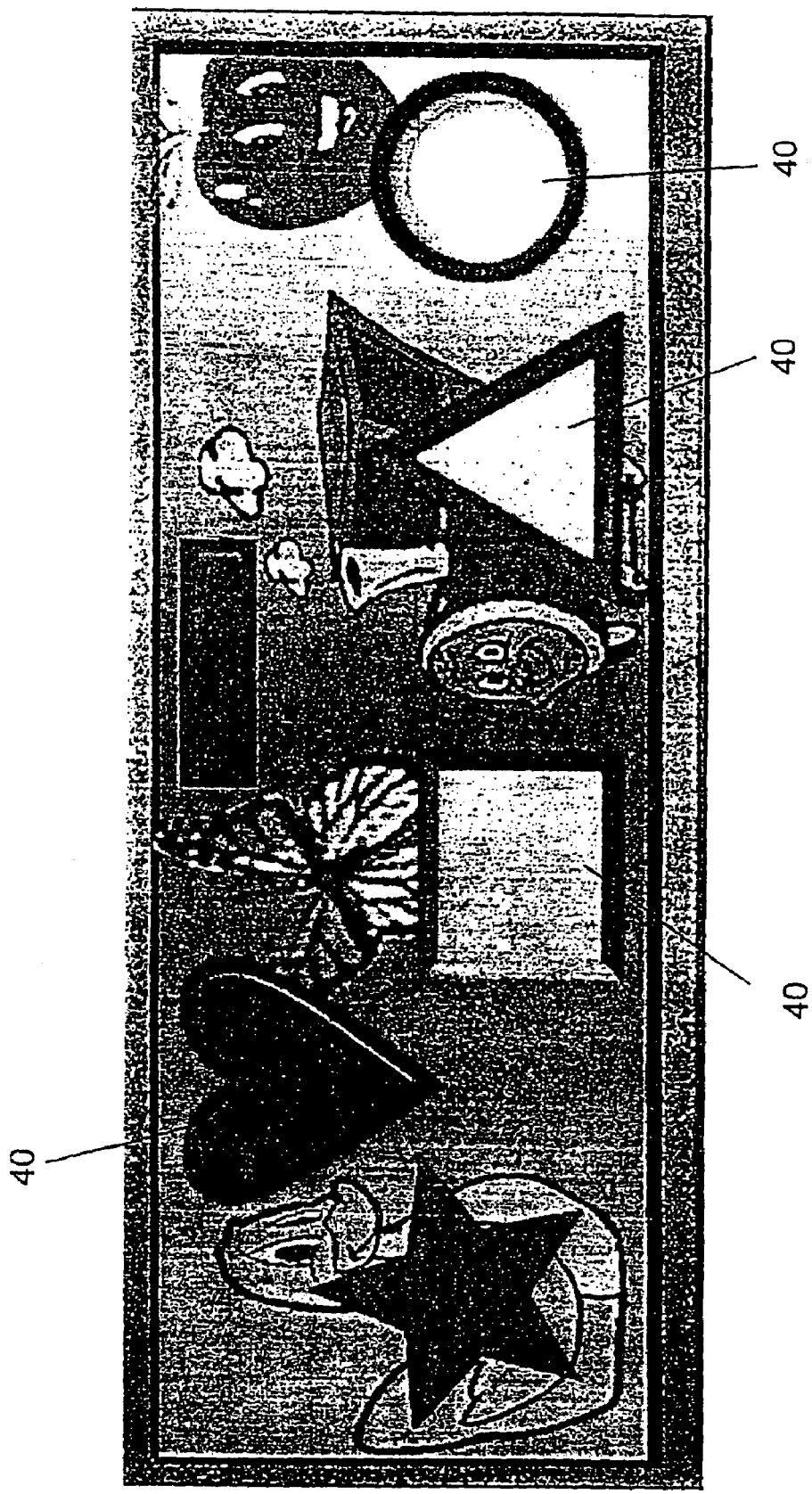
FIG. 4 illustrates a keyboard for applications directed to young users, according to a preferred embodiment of the invention.

FIG. 4 illustrates a keyboard for applications directed to young users, according to a preferred embodiment of the invention. The keys 40 are in different shapes, such as triangular, circular and heart-shaped. Due to the young age of the users of this keyboard, the number of keys is relatively small.

Moreover, the user may individually design the layout of the keyboard, according to his needs. The keys 40 may be removed, and replaced with other keys, which have different icons and text.

In the prior art, the user had to perform several operations in order to execute a program. For example, in Windows™ based applications, the user has to go to the "Program files" section, and then select the program he wishes to use. The process may be simplified by "shortcuts"; however, not all users have the knowledge how to create a shortcut. Moreover, very young children cannot read, and therefore running an application without a desktop icon is impossible.

According to a preferred embodiment of the invention, the type of the keyboard is detectable. The removable part 20 of the keyboard comprises an IC (Integrated Circuit) 70 which provides an individual code, by which the type of the keyboard is identified, and the base 10 of the keyboard comprise a data recognition device 80, which is able to detect the code that is stored in IC (Integrated Circuit) 70.

Detecting the type of the keyboard simplifies the use of the host operation, since the host is directed to execute the application to which the keyboard has been dedicated, to set the special settings of the application, and to suspend the application whenever the removable part of the keyboard is taken out. A special setting can be defined by the user or predefined by the software, which suits the user's preferences, such as small or large icons, different levels of guidance, etc. Using large icons, the user is exposed to less data than when using small icons, therefore small icons are usually more suitable for advanced users, whereas large icons are better suited for beginners.

Whenever there are several programs using the same keyboard type, the software, which keeps track of the presence of the keyboard, may display a menu from which the user can select the appropriate program to be executed. For instance, the famous football game FIFA, has several versions, such as FIFA-98, FIFA-99, and so forth. Therefore, if different versions of the software are installed on the same host, the user should be given the option of selecting the version to be executed.

Usually, there is a software component running on the host device, which operates as a "watchdog" that reacts whenever the code of the keyboard is changed. Technically, there are a variety of ways to program the watchdog, such as hooking the keyboard interrupt, as is known to any programmer skilled in the art.

According to an embodiment of the invention, the detection of the unique ID of the keyboard is performed by a physical contact in a way similar to the insertion of electronic cards into the computer sockets.

According to another embodiment of the invention, detection of the unique ID of the keyboard is performed by electro-optical means. For example, a set of photoelectric cells resides on the fixed part of the keyboard. The removable part of the keyboard contains a light source that lights up some of the photoelectric cells, while some of the cells remain unlighted. The lighted cells may be considered as "1" and the unlighted cells may be considered as "0". Therefore, a binary representation is comprised, which represents the ID of the keyboard.

According to another embodiment of the invention, detection of the unique number of the keyboard is performed by wireless transmission between the removable part 20 of the keyboard and the base 10 of the keyboard. For this purpose, it is possible to use a short-range transmitter. The transmitter resides on the removable part of the keyboard, while the receiver resides on the fixed part of the keyboard.

Alternatively, reading the information embedded in the removable part 20 of the keyboard is done by RF transmission, which provides the energy required for the operation of the memory device 70, in which the ID is embedded. This way, the memory device 70 is "passive".

According to another embodiment of the invention, the identification of the keyboard type is carried out by a permanent contact, which causes an effect of permanently pressing a single or a group of keys. In this case, the ID is the combination of the activated key(s). A watchdog software component that runs on the host computer keeps track of the combination of the pressed keys. Upon changing of the combination, the watchdog checks for the permanency of the new combination for a predefined period. If the combination sustains this period, then the watchdog software component performs the operations associated with the identified type of keyboard.

For example, the projection turns on the "F" and the "I" characters. Whenever the watchdog software component detects that the "F" and "I" characters were pressed for a period of 3 seconds, it activates the operations associated with the FIFA game.

Figure 5:
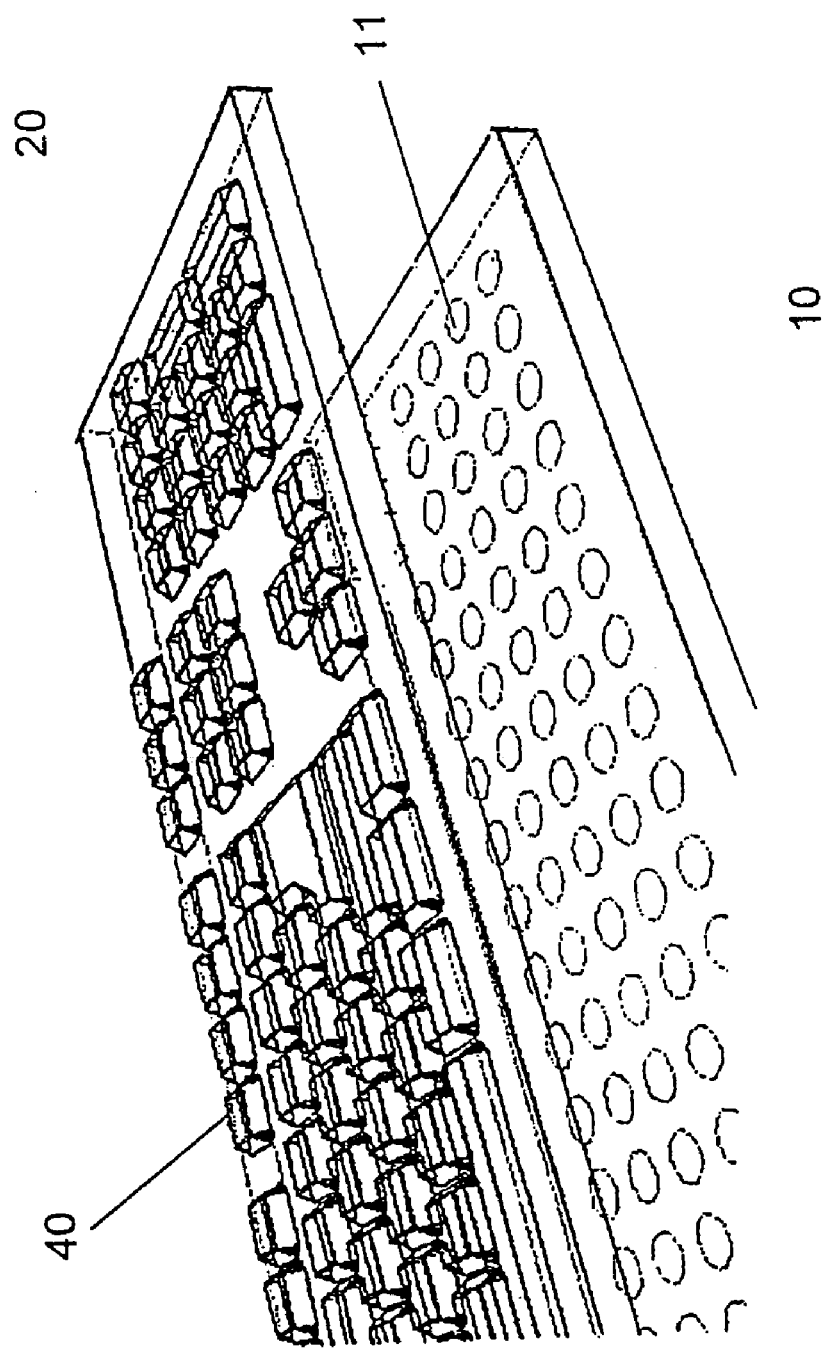
FIG. 5 schematically illustrates a keyboard, according to a preferred embodiment of the invention.

FIG. 5 schematically illustrates a keyboard, according to a preferred embodiment of the invention.

According to the prior art, the sensors 11 are located such a way that pressing a key 40 moves it down, where it then touches a sensor 11. As a result, the circuitry embedded in the keyboard translates the state of the sensors to digital values that represent the appropriate keys. These values are conveyed to the host.

According to a preferred embodiment of the present invention, the foundation of the keys is removable. Since there is no electrical connection between the keys 40 and the sensors 11, removal of the keys cannot cause any short circuit. Therefore, the keys may be removed without causing any interference with the host's operation.

Figure 6:
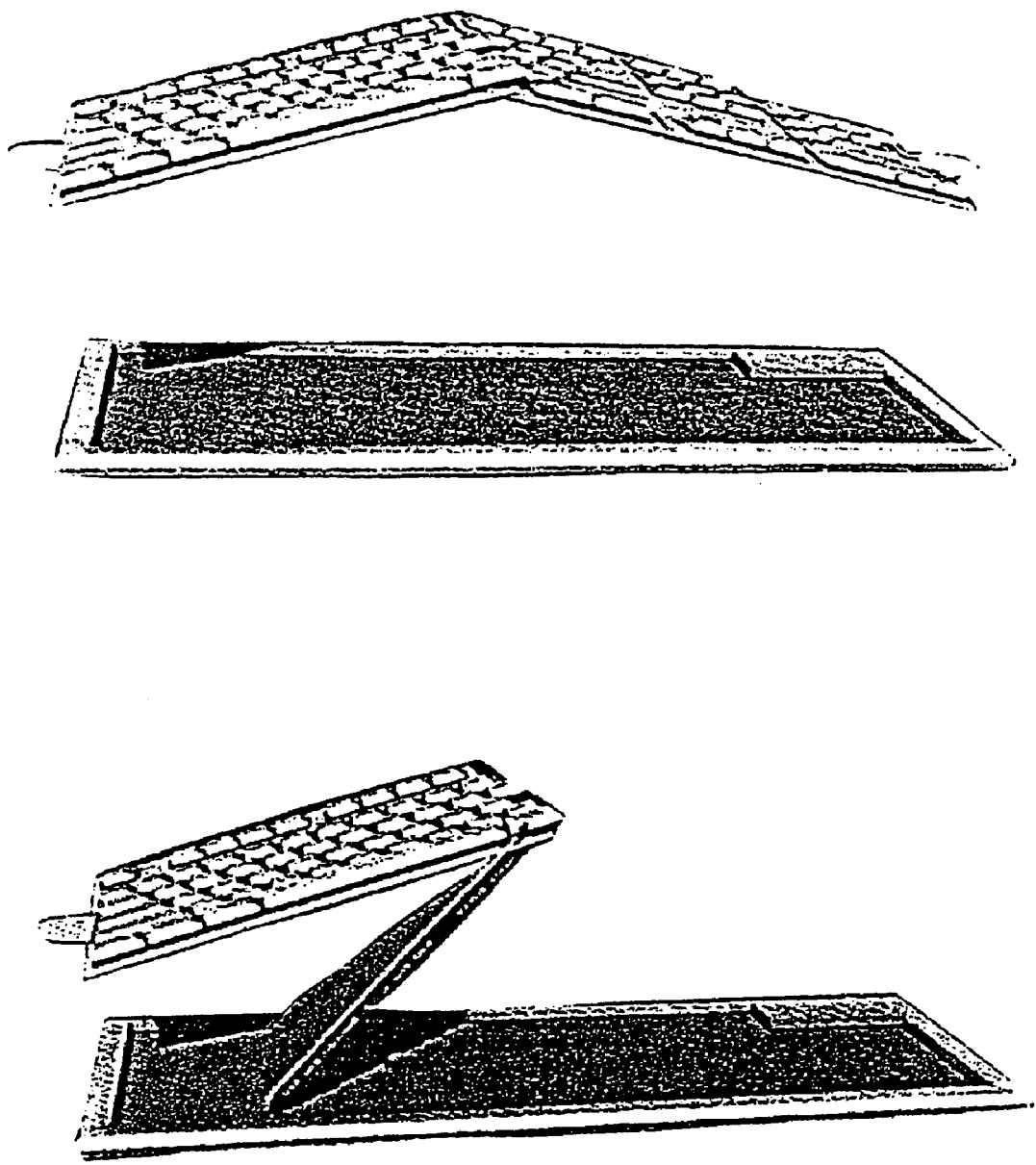
FIG. 6 schematically illustrates the folding of a removable part of the keyboard into three parts, according to a preferred embodiment of the invention.

FIG. 6 schematically illustrates the folding of a removable part of the keyboard into three parts, according to a preferred embodiment of the invention. This attribute decreases the size needed for storing the removable part of the keyboard. Therefore, the removable part of the keyboard may be packed with the other parts of a computer game or application, such as CD and manual, in a compact pack, and be sold this way. Moreover, since the number of keys needed for various implementations is very small, it is possible to design the removable part 20 of the keyboard in such a way that all the keys will be concentrated in a small area; hence, its size will be compact.

The separation between the removable part and the base of the keyboard provides more features, which may be useful for developing new applications and implementations. For instance, some effort has been made to provide a secure access on purchase operations through the Internet, such as "smart cards" whereby the user inserts an appropriate reader into the computer. Since such a reader is not needed for any other application, its presence in personal computers is very rare. However, according to the invention, the removable part of the keyboard may be used with the appropriate circuitry as a "smart card" which operates as an identification card. This way there is no need to use smart-card readers, and a new gateway is opened for the users to carry out e-commerce.

According to a preferred embodiment of the invention, the keyboard may comprise additional codes—some of them being embedded in the keyboard (such as the type of the removable part), and some of them being programmable (such as the user's ID).

The removable part may actually be a plurality of parts. For instance, the keypad of the 101-key keyboard may be produced in two parts, which operate independently: the keypad produced as a separate part for the other keys, which reside on the other, rigid part of the keyboard. This way instead of the keypad, the user may use another part, which is associated with another application, such as a computer game or Internet-associated application.

Figure 7:
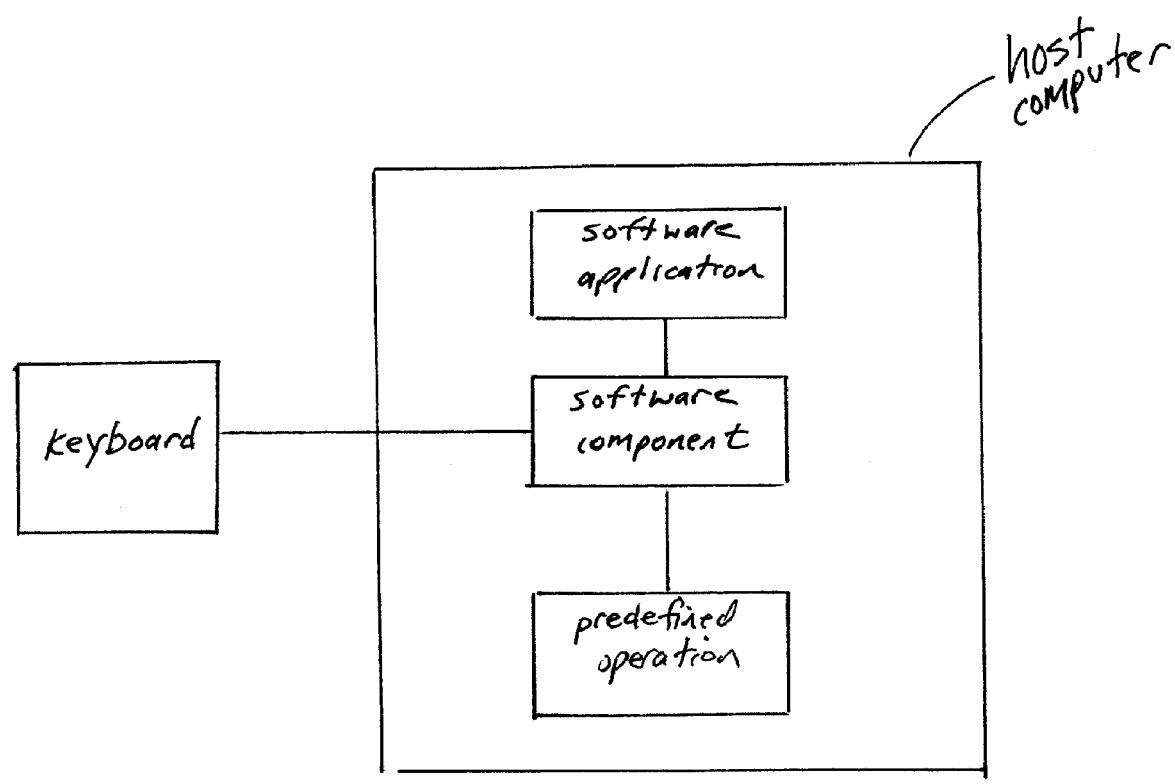
FIG. 7 illustrates a host computer connected to a keyboard according to an embodiment of the invention.

FIG. 7 shows an exemplary method for connecting a keyboard to a host computer comprising providing a keyboard for use as an input device for a host computer, the computer being able to execute one or more software applications, the keyboard comprises a removable part which has a set of specific keys each of which having a contact and held by a foundation, the removable part being associated with a specific software application to be executed on said host computer using said set of specific keys, the removable part comprising a device for data-connection and a data storage device containing an identification data associated with the specific application, and a fixed part, into which said removable part is installed, the fixed part comprising a set of contacts, each of which corresponding to contacts of the removable part for receiving input data and a reader device for reading said identification data from the data storage, providing a software component for reading the identification data and executing one or more programs and/or one or more applications and/or one or more predefined operations, the software component residing on the host computer and executed by the host personal computer where the programs, the applications and the operations are associated with the identification data; connecting between said removable part and the fixed part by contact upon placing the removable part on the fixed part; reading the identification data by the reader device; conveying the identification data from the keyboard to the host computer; and executing one or more programs and/or one or more applications and/or one or more predefined operations, the program, the application and the operation being associated with the identification data.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A personal computer keyboard for use as an input device for a host personal computer, said personal computer being able to execute one or more gaming applications software programs, comprising:

a removable part comprising a set of specific keys each of which interacts through non-electrical means to a corresponding contact, said removable part being associated with a specific gaming applications software program to be executed on said host using said set of specific keys, said removable part comprising a memory device with data storage containing an individual code associated with said specific gaming applications software program;

a fixed part, into which said removable part is installed, said fixed part comprising:

I) a set of contacts, each of which corresponding to the set of specific keys of said removable part, for receiving input data;

II) a data recognition device for reading said individual code associated with said specific gaming applications software program from said memory device so as to allow said host personal computer to execute said specific gaming applications software program upon placing said removable part into said fixed part.

2. A personal computer keyboard according to claim 1, wherein the set of specific keys is compatible with a standard 101-keys keyboard, and wherein each key interacts with a contact on the fixed part in a one-to-one correspondence.

3. A personal computer keyboard according to claim 1, wherein said removable part is a single rigid unit or a plurality of rigid units that can be folded.

4. A personal computer keyboard according to claim 1, wherein said individual code is embedded into said memory device by electronic means and/or by electro-optic means and/or by electromechanical means and/or magnetic means.

5. A method for connecting a personal computer keyboard to a host personal computer, comprising:

(a) providing a personal computer keyboard for use as an input device for the host personal computer, said personal computer being able to execute one or more gaming applications software program, comprising:

a removable part comprising a set of specific keys each of which interacts to a corresponding contact, said removable part being associated with a specific gaming applications software program to be executed on said host personal computer using said set of specific keys, said removable part comprising a memory device for storing an individual code associated with said specific gaming applications software program;

a fixed part, into which said removable part is installed, said fixed part comprising:

I) a set of contacts, each of which corresponding to contacts of said removable part for receiving input data;

II) a data recognition device for reading said individual code associated with said specific gaming applications software program from said memory device so as to allow said host personal computer to execute said specific gaming applications software program upon placing said removable part into said fixed part;

(b) providing a software component for reading said individual code associated with said specific gaming applications software program and additionally executing one or more programs and/or one or more applications and/or one or more predefined operations, said software component residing on said host personal computer and executed by said host personal computer, said program, said application and said operation associated with said ID;

(c) connecting between said removable part and said fixed part by contact upon placing said removable part on said fixed part;

(d) reading said individual code by said data recognition device;

(e) conveying said individual code from said personal computer keyboard to said host personal computer; and (f) executing additionally on said host personal computer one or more programs and/or one or more applications and/or one or more predefined operations, said program, said application and said operation being associated with said individual code.

6. A system for use as an input mechanism for a host personal computer, comprising:

a personal computer keyboard for use as an input device for a host personal computer, said personal computer being able to execute one or more gaming applications software programs, comprising:

a removable part comprising a set of specific keys each of which interacts with a corresponding contact, said removable part being associated with a specific gaming applications software program to be executed on said host personal computer using said set of specific keys, said removable part comprising a memory device for containing identification data associated with said specific gaming applications software program;

a fixed part, into which said removable part is installed, said fixed part comprising:

I) a set of contacts, each of which corresponding to contacts of said removable part for receiving input data;

II) a data recognition device for reading said identification data associated with said specific gaming applications software program from said memory device so as to allow said host personal computer to execute said specific gaming applications software program upon placing said removable part into said fixed part; and a software component for reading said identification data associated with said specific gaming applications software program and additionally executing one or more programs and/or one or more applications and/or one or more predefined operations, said software component residing on said host personal computer and executed by said host personal computer, said program, said application and said operation being associated with said identification data.

7. A system according to claim 6, wherein said predefined operations are directed to setup said host personal computer.

* * * * *